United States Patent
Shaffer et al.

(10) Patent No.: US 7,349,535 B2
(45) Date of Patent: Mar. 25, 2008

(54) METHOD AND SYSTEM FOR AUTOMATIC CALL DISTRIBUTION BASED ON LOCATION INFORMATION FOR CALL CENTER AGENTS

(75) Inventors: Shmuel Shaffer, Palo Alto, CA (US); Gebran G. Chahrouri, Menlo Park, CA (US); Joseph F. Khouri, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 673 days.

(21) Appl. No.: 10/792,364

(22) Filed: Mar. 3, 2004

(65) Prior Publication Data

US 2005/0195960 A1    Sep. 8, 2005

(51) Int. Cl.
*H04M 3/523* (2006.01)
*H04Q 7/20* (2006.01)

(52) U.S. Cl. ............................ 379/265.11; 379/201.06; 379/265.12; 379/265.13; 455/456.1; 455/456.3

(58) Field of Classification Search ................ 379/201.06–201.1, 265.01–265.14; 455/456.1–456.6
See application file for complete search history.

(56) References Cited

U.S. PATENT DOCUMENTS

| | | | |
|---|---|---|---|
| 5,036,535 A | 7/1991 | Gechter et al. | 379/210 |
| 5,168,515 A | 12/1992 | Gechter et al. | 379/265 |
| 5,271,058 A | 12/1993 | Andrews et al. | 379/210 |
| 5,274,700 A | 12/1993 | Gechter et al. | 379/210 |
| 5,309,513 A | 5/1994 | Rose | 379/265 |
| 5,915,012 A | 6/1999 | Miloslavsky | 379/220 |
| 5,933,492 A | 8/1999 | Turovski | 379/265 |
| 6,021,428 A | 2/2000 | Miloslavsky | 709/206 |
| 6,055,308 A | 4/2000 | Miloslavsky et al. | 379/265 |
| 6,175,564 B1 | 1/2001 | Miloslavsky et al. | 370/352 |
| 6,229,888 B1 | 5/2001 | Miloslavsky | 379/265 |
| 6,272,347 B1 * | 8/2001 | Griffith et al. | 455/445 |
| 6,373,836 B1 | 4/2002 | Deryugin et al. | 370/352 |
| 6,581,105 B2 | 6/2003 | Miloslavsky et al. | 709/238 |
| 6,597,685 B2 | 7/2003 | Miloslavsky et al. | 370/352 |
| 6,625,139 B2 | 9/2003 | Miloslavsky et al. | 370/352 |
| 6,816,733 B1 * | 11/2004 | Dezonno et al. | 455/456.1 |
| 7,031,447 B2 * | 4/2006 | Mani | 379/201.06 |

* cited by examiner

*Primary Examiner*—Harry S. Hong
(74) *Attorney, Agent, or Firm*—Baker Botts L.L.P.

(57) ABSTRACT

A method for distributing calls of an automatic call distributor system includes determining location information for agents at a call center. The method further includes routing a request for connection with one of the agents to one of the agents based at least in part on the location information. A method for managing agents in a call center includes determining location information for a plurality of agents in a call center. The method further includes communicating a message to at least one of the agents requesting the agent to move to a new location in response to at least one request for connection with one of the agents.

55 Claims, 4 Drawing Sheets

FIG. 1

| 304 | 306 | 308 |
|---|---|---|
| RESOURCE | LOCATION | NEARBY AREAS |
| ELECTRONICS DEPARTMENT | 1 | 2, 3 |
| LUMBER DEPARTMENT | 2 | 1 |
| APPLIANCES DEPARTMENT | 3 | 1, 4 |
| HARDWARE DEPARTMENT | 4 | 3 |

| 312 | REQUESTED RESOURCE LOCATION 306 | | | |
|---|---|---|---|---|
| | 1 | 2 | 3 | 4 |
| POSSIBLE AGENT POSITIONS  1 | 10 | 7 | 6 | 1 |
| 2 | 7 | 10 | 7 | 5 |
| 3 | 6 | 7 | 10 | 8 |
| 4 | 1 | 5 | 8 | 10 |

METHOD AND SYSTEM FOR AUTOMATIC CALL DISTRIBUTION BASED ON LOCATION INFORMATION FOR CALL CENTER AGENTS

TECHNICAL FIELD OF THE INVENTION

The present invention relates generally to automated network communication distribution and more particularly, to a method and system for automatic call distribution based on location information for call center agents.

BACKGROUND OF THE INVENTION

Automatic call distributors (ACDs) are specialized phone systems designed to route incoming calls to available personnel, referred to as "agents," so that calls are properly and evenly distributed. Increasingly, companies are using ACDs to make outgoing calls. ACDs generally perform one or more of the following functions: (i) recognize and answer incoming calls; (ii) review database(s) for instructions on what to do with a particular call; (iii) using these instructions, identify an appropriate agent and queue the call, often times providing a prerecorded message; and (iv) route the call to an agent as soon as the agent is available.

The term automatic call distributor comes from distributing the incoming calls in a logical pattern to a group of agents. That pattern may be uniform (to distribute the work uniformly), or it may be top-down (the same agents in the same order get the calls and are kept busy, the ones on the top typically being kept busier than the ones on the bottom), or it may be specialty routing, where calls are routed to agents who are most likely able to help the caller the most.

Skill-based routing (AKA resume routing) is an ACD feature that provides for the selection of an appropriate agent for handling a particular call. With this feature, agents are registered with their skills set as resources for handling calls. Examples for different skill sets are languages (English, French, Spanish, etc.) or business types (electronics, appliances, hardware, lumber, etc.). The caller indicates the skill that she requires for a particular transaction, and the system either finds the appropriate resource or queues the caller until the resource with the requested skill becomes available.

Call center agents may also have access to particular resources that are physically located within one or more call center facilities. Such resources may be used by the call center agents to respond to requests from a caller. For example, an agent providing a customer with information about availability of particular products may find it useful to be located in a department of a store containing that particular product. Various call center agents may be in proximity to different resources at different times. This may place limits on the ability of call center agents to respond to requests.

SUMMARY OF THE INVENTION

The present invention solves many of the problems and disadvantages associated with prior automatic call distributor systems and methods. In a particular embodiment, the present invention provides a system and method that includes location information for call center agents in determining the assignment of calls to agents. This helps call center agents to more efficiently use resources located in a specific location.

In a particular embodiment of the present invention, a method for distributing calls of an automatic call distributor system includes determining location information for a plurality of agents at a call center. The method further includes routing a request for connection with one of the agents to one of the agents based at least in part on the location information. In another embodiment, a method for managing agents in a call center includes determining location information for a plurality of agents in a call center. The method further includes communicating a message to at least one of the agents requesting the at least one agent to move to a new location in response to at least one request for connection with one of the agents.

Technical advantages of particular embodiments of the present invention include a system and method that uses optimized agent selection to provide efficient use of resources. Such a system uses location information along with skill information for agents when making call routing decisions. Thus, calls may be routed in order to make the most efficient use of agent skills and proximity to particular resources.

Another technical advantage of a particular embodiment of the present invention includes a system and method that can instruct agents to move to an area where they will be most valuable. Such a system may send a message to an agent that instructs the agent to move in response to determining that the agent would respond to requests more efficiently in proximity to a particular resource. Thus, the agent may be moved to an area that increases the agent's usefulness in responding to demands from callers.

Yet another technical advantage of the present invention includes a system and method that uses location information in determining how to queue calls. For example, if a particular agent is located near a particular resource, then call requests requiring that resource may be given higher priority. This may result in more efficient queuing of incoming calls.

Still another technical advantage of particular embodiments of the present invention includes a system and method that makes efficient use of agents with rare or unique skills by moving the agents to an optimal location. In instances in which a small number of agents have a particular skill, those agents can be moved to a particular location in order to be in proximity to a resource associated with a call request requiring the particular skill. For example, if there is one agent that speaks German, and a call request requires a German-speaking agent in the hardware department, the system can instruct the German-speaking agents to move to the hardware department. This may increase the efficiency with which the rare or unique skills of particular agents are being used.

Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following descriptions, taken in conjunction with the accompanying drawings, in which.

DETAILED DESCRIPTION OF THE INVENTION

Figure 1:
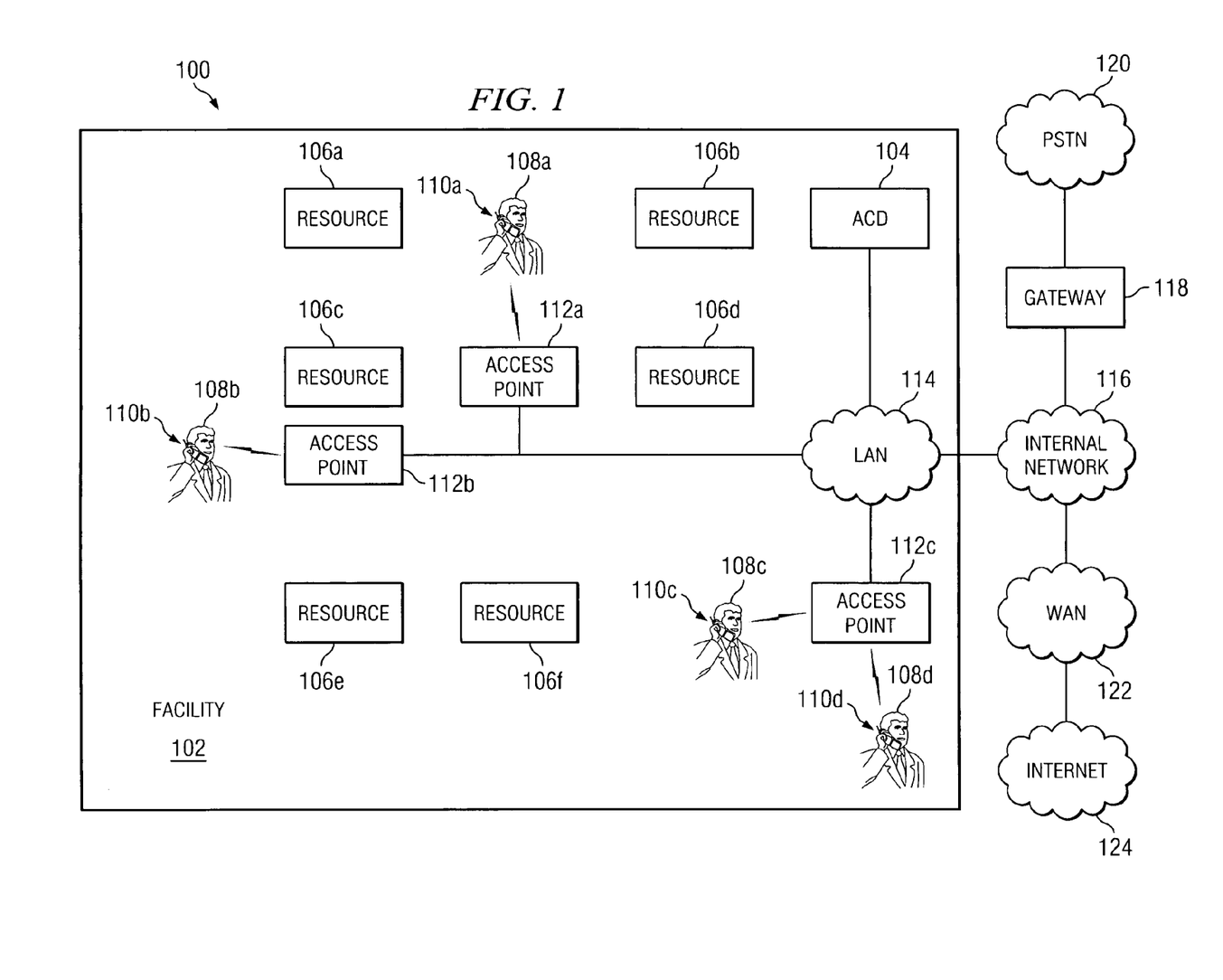
FIG. 1 illustrates a communication system including an automatic call distributor (ACD) that routes calls to call center agents in proximity to various resources within a facility.

FIG. 1 illustrates a communication system 100 including an automatic call distributor (ACD) 104 that routes calls to agents 108a-108d within a facility 102, using a local area network (LAN) 114. ACDs are specialized phone systems designed to route incoming calls to available agents, so that calls are properly and/or evenly distributed. For the purposes of this specification, "ACD" shall refer to any combination of hardware, software and/or embedded logic which is operable to automatically distribute incoming calls.

Particular embodiments of the present invention include a method to enhance the efficiency of the call center by utilizing the location of the agents. Additional embodiments include a system and method that utilizes location information for optimizing the routing of calls to agents. Various embodiments of the present invention include ways to improve the efficiency of call routing, to direct agents to move to areas where their presence is most needed, and to optimize the order by which calls are being answered.

The use of location information in a call center is valuable in a number of diverse situations. For example, in a home improvement store, sales personnel may walk the store floor helping shoppers and taking calls as they walk around the store. Wireless communication may be handy when the caller wants product specific information that requires a salesperson to go to the shelf where the product is stored and verify availability. In another example, a call center might include agents who provide technical support for a particular type of machinery, such as a robot. To troubleshoot and diagnose issues, the technical support staff may need to go to a lab that has a specific type of robot in order to duplicate and/or resolve the issues. The agents' offices may be in a different area or on a different floor than the lab, and therefore, the agents need the ability to move around the site and the equipment in order to respond to requests efficiently.

In the illustrated embodiment, incoming calls are routed to ACD 104 at facility 102. Within facility 102, call center agents 108a-108d communicate over LAN 114 using wireless communication devices 110a-110d, which access LAN 114 using a variety of access points 112a-112c. Particular agents 108a-108d may be in proximity to different resources 106a-106f, which may be useful in responding to requests from callers. Resources 106a-106f may include any suitable physical resources for which proximity to the resources is useful for enabling agents 108a-108d to fulfill a caller request. For example, resources 106a-106f may include departments of a retail store, stock rooms, computers, record storage, equipment, or any other suitable object or location. The teachings of the present invention include a system and method in which ACD 104 uses location information to selectively route calls to particular agents 108a-108d in order to make use of particular resources 106a-106f.

In general, ACD 104 manages call distribution to agents 108a-108d. In performing call distribution, various embodiments of ACD 104 may use call distribution information in a variety of ways. In particular embodiments, ACD 104 may map the location in which the agent is physically located into an agent skill. For example, if an agent is in the lumber department, the agent may be assigned a proficiency of 10 out of 10 for the "lumber location" skill. A second agent in the hardware department, which is adjacent to the lumber department, could be assigned a proficiency of 9 out of 10 in the "lumber location" skill and so on. This "location skill" may be used in conjunction with the other agent skills to determine the best agent to handle any incoming call.

In a particular embodiment, location information may be used to improve routing of incoming calls to agents. The routing logic of ACD 104 obtains location information for each agent 108a-108d and maps the information to resources 106a-106f in the agent's proximity. For example, the fact that an agent in a store connects to ACD 104 via a particular wireless access point may be mapped to indicate that the agent is in proximity to a particular department, such as a lumber department. In a similar way, locations of other agents may be mapped to particular departments. Thus, callers who have a question about lumber may be routed to agents in the lumber department. In another embodiment, if an agent in the lumber department is busy, the call requesting assistance with lumber may be transferred to a second agent whose location is identified as being in the hardware department, which is adjacent to the lumber department.

In another embodiment, location information may be used to direct the agents to areas in which their services are needed. As callers are queued for agents, an Interactive Voice Response ("IVR") system probes them for the nature of their inquiries. Agents may then be relocated in response to the results of these queries. For example, if the IVR system finds that there are numerous callers who need help with lumber-related questions, and there are no electrical questions, then ACD 104 may direct one or more agents in the electrical department to the lumber department. In another embodiment, ACD 104 may direct only agents with a certain level of proficiency in a particular skill to move to a particular resource 106a-106f. Thus, in the previous example, ACD 104 could direct only those agents with a certain proficiency in lumber-related knowledge to move to the lumber department.

In other embodiments, an agent that is directed to move by ACD 104 can signal back to ACD 104 if the agent can comply with the request. Thus, for example, if the agent is serving a customer and cannot comply with the request to move to another department, the agent can signal that the agent is unable to comply with the request to move to another department. This interaction with ACD 104 may be performed using a variety of communication techniques, including but not limited to personal digital assistants (PDAs) or extensible markup language (XML) rendered to a wireless device such as a cellular telephone. Although particular methods of interaction between agents 108a-108d and ACD 104 are described, it should be understood that any method of communication between agents 108a-108d and ACD 104 is contemplated within the scope of the present invention.

In still other embodiments, callers are queued for service. An IVR system may obtain information about the callers' respective areas of inquiry. In accordance with this scenario, the system selects the best order to present the queued calls to the mobile agents. To illustrate an example of this operation, suppose that there is one agent providing services to callers, and that calls have been received requesting assistance with lumber, electrical products, and lumber, in that order. If ACD 104 were to distribute the calls in the order they were received, the agent might need to be in the lumber department to assist the first caller, to move to the electrical department to assist the second caller, and to return to the lumber department to assist the third caller. Instead, in accordance with a particular embodiment of the present invention, ACD 104 may recognize that providing service to the third caller before the second caller would require the agent to move between the departments fewer times, and accordingly, ACD 104 may connect the third caller before the second caller. Taking the same example, in another embodiment, the second caller may be skipped in the queue when a later caller would not require the agent to move to another department. Every time the second caller is skipped, the priority of the second caller may be increased, so that when the priority of the second caller becomes high enough, the agent may be asked to move to the electrical department even though there are still callers in the queue requesting assistance associated with the lumber department.

Thus, in general, optimized call routing in a call center may be based on an agent's physical location. The location information may be used, for example, to optimally route calls to the right agent, to select the order in which the calls are directed to specific agents, and to direct agents to move to areas wherein their services may be better utilized. Agent location information may also be analyzed to improve or optimize the design of call center applications, such as improving the ability of an IVR application to analyze a caller's request.

In the illustrated embodiment, LAN 114 communicates wirelessly with agents 108a-108d at facility 102 using access points 112a-112c in communication with wireless communication devices 110a-110d. LAN 114 may communicate with wireless communication devices 110a-110d using any suitable wireless communication protocol. In an alternative embodiment, LAN 114 may use wireline communication with agents 108a-108d. In another alternative embodiment, agents 108a-108d and resources 106a-106f may be distributed among multiple facilities 102. In yet another alternative embodiment, system 100 may include multiple ACDs 104 working in cooperation to distribute calls among agents, at one or more facilities 102.

LAN 114 may be directly coupled to other computer networks including, but not limited to, another LAN 116, a WAN 122 or the Internet 124. In addition to being coupled to other computer networks, LAN 114 may also be coupled to telecommunication networks through the use of interfaces or components, for example gateway 118. In the illustrated embodiment, LAN is coupled with PSTN 120 through gateway 118. PSTN 120 includes switching stations, central offices, mobile telephone switching offices, pager switching offices, remote terminals, and other related telecommunications equipment that are located throughout the world.

With regard to the illustrated embodiment, LAN 114 may include any combination of network components, gatekeepers, call managers, routers, hubs, switches, gateways, endpoints, or other hardware, software, or embedded logic implementing any number of communication protocols that allow for the exchange of packets, segments, frames, cells or other portions of information (generally referred to as "packets"). Although the illustrated embodiment includes a LAN 114, alternative embodiments may use any sort of communication network in place of LAN 114, such as a wide area network (WAN), global distributed network such as the Internet, Intranet, Extranet, or any other form of wireless or wireline communication network. In general, the portions of this specification relating to LAN 114 may generally apply to any network that is capable of transmitting audio and/or video telecommunication signals, data, and/or messages, or that provides for the communication of packets.

In a particular embodiment, LAN 114 employs voice communication protocols that allow for the addressing or identification of endpoints, nodes, and/or ACDs coupled to LAN 114. For example, using Internet protocol (IP), each of the components coupled together LAN 114 in communication system 100 may be identified in information directed using IP addresses. In this manner, LAN 114 may support any form and/or combination of point-to-point, multicast, unicast, or other techniques for exchanging media packets among components in communication system 30. It should be understood that any network component capable of exchanging audio, video, or other data using frames or packets, are also included within the scope of the present invention. It should also be understood that the described system may be embodied in a non-packet based communication system, such as a time division multiplexing (TDM) call center.

IP networks transmit data (including voice and video data) by placing the data in packets and sending each packet individually to the selected destination, along one or more communication paths. Unlike a circuit-switched network (like PSTN 120) a dedicated circuit is not required for the duration of a call or fax transmission over IP networks. The technology that allows telecommunications to be transmitted over an IP network may be referred to as Voice over IP (VoIP), or simply Voice over Packet (VoP). In the illustrated embodiment, wireless communication devices 110a-110d, ACD 104, and gateway 118 are IP telephony devices. IP telephony devices have the ability of encapsulating a user's voice (or other input) into IP packets so that the voice can be transmitted over LAN 114.

It will be recognized by those of ordinary skill in the art that wireless communication devices 110a-110d, ACD 104, and/or gateway 118 may be any combination of hardware, software, and/or encoded logic that provides communication services to a user. For example, wireless communication devices 110a-110d may include a telephone (such as the Cisco 7920 IP wireless phone), personal digital assistant, laptop, headset, pager, or other hardware, software, and/or embedded logic that supports the communication of packets using LAN 114. Although FIG. 1 illustrates a particular number and configuration of wireless communication devices 110a-110d and access points 112a-112c with ACD 104, communication system 100 contemplates any number or arrangement of such components for communicating media. Moreover, the described ACD 104 may be applicable to any call center, not merely one that uses packet-based networks such as LAN 114. Thus, although the description of the illustrated embodiment focuses primarily on network applications, it should be understood that any call center may be within the scope of the present invention.

Figure 2:
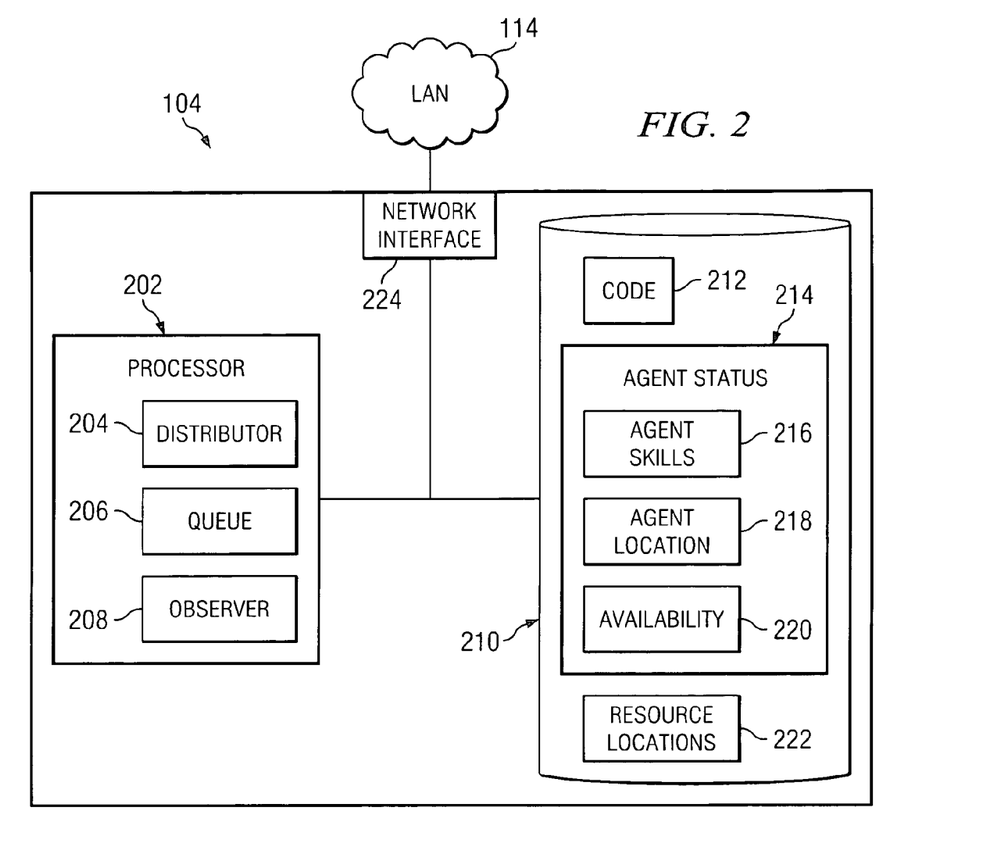
FIG. 2 illustrates an ACD of FIG. 1 in more detail, illustrating aspects of the present invention.

FIG. 2 illustrates ACD 104 in more detail, in accordance with a particular embodiment of the present invention. ACD 104 includes a network interface 224 which couples ACD 104 with LAN 114. When a call is received at ACD 104, a processor 202 is used to determine which of a plurality of agents 108a-108d should receive the call using wireless communication devices 110a-110d, respectively. In doing so, processor 202 may use a memory lookup, a database, or other memory module, such as memory module 210. Processor 202 and memory module 210 may be centrally located (local) with respect to one another, or they may de distributed throughout LAN 114. It will be recognized by those of ordinary skill in the art that ACD 104 may include any number of processors or memory modules to accomplish the functionality and features described herein.

Processor 202 may be one or more microprocessors, controllers, or any other suitable computing device, resource, hardware, software, or embedded logic. In the illustrated embodiment, processor 202 includes three modules: a distributor 204, a queue 206, and an observer 208. The three modules correspond to particular tasks performed by processor 202, but it should be understood by one skilled in the art that the described tasks may be distributed among several processors, or alternatively, that multiple tasks may be consolidated within a single processor. The tasks performed by the three modules are as follows: distributor 204 connects incoming calls to agents 110a-110d, queue 206 manages and maintains calls that are waiting to be connected to agents 110a-110d, and observer 208 monitors the status of agents 110a-110d and stores appropriate information in memory module 210.

Memory module 210 may be any form of volatile or non-volatile memory including, without limitation, magnetic media, optical media, random access memory (RAM), read-only memory (ROM), removable media, or any other suitable local or remote memory component. In the illustrated embodiment, memory module 210 stores code 212 executed by processor 202 to perform various tasks, such as those performed by distributor 204, queue 206, and observer 208. In the illustrated embodiment, memory module 210 also stores agent status information 214 and resource locations 222. Agent status information 214 may include agent skill information 216 (also known as "resume information"), agent locations 218, and agent availability 220. Resource locations 222 include information about the physical locations of resources 106a-106f, and may also include information about the proximity of resources 106a-106f to one another and to other locations in facility 102, such as the locations of access points 112a-112c. Various alternative embodiments of ACD 104 may store different or additional information useful for call routing as well.

ACD 104 receives incoming call requests that may be addressed by one of the agents 110a-110d with particular skills having access to particular resources 106a-106f. If a suitable agent is available to receive the incoming call, distributor 204 of ACD 104 connects the call with an agent having an appropriate skill(s) to address the call(er). If an agent is not available, the call may be held in queue 206 in order to wait for an appropriate agent(s). While a caller is waiting for an agent, ACD 104 may perform one or more of several functions including data collection from the user, playing of pre-recorded messages, or other automated process. As soon as the agent with the appropriate skill becomes available, distributor 204 connects the call with the appropriate agent.

In a particular embodiment of the present invention, ACD 104 is configured to accomplish skills-based routing, which refers to routing incoming calls based on the type of service requested. Moreover, ACD 104 may use location information 218 and resource locations 222 to route calls to agents in proximity to resources 106a-106f appropriate to the type of service requested. This assures that calls go to agents with the skills and access to resources 106a-106f to provide the highest quality of service to the calling customer. Skills-based routing takes advantage of the routing capabilities of ACD 104, in consideration of the unique skills of individual agents or agent groups, the requirements or preferences of individual callers, and the availability of resources 106a-106f associated with a requested service type. In one example of this type of call routing, a customer requesting information about the availability of a particular electronic part from a supplier can be directed to an agent having skills, such as proficiency in electronics, and proximity to resources, such as shelves of electronic parts, that enable the agent to respond to the customer's query.

The routing process may be accomplished on the basis of a client profile stored in a database on an adjunct computer system linked to ACD 104, or on memory module 210 or based on information collected via an interactive voice response (IVR) unit. Prior to connecting the call, the database would be queried, with the query process being initiated on the basis of the caller's touch-tone entry of an account number, identification number, preference, or on the basis of caller ID (for routing based on geography). Examples of methods by which the caller's preferences may be determined include: (i) caller ID in order to determine the source of the incoming call, (ii) by selection of the caller using touch-tone prompts or other data entry techniques, (iii) according to a user profile stored within a memory module coupled to ACD 104, or (iv) according to an identification number associated with the caller.

The routing process also uses information about agents 108a-108d monitored by observer 208 and stored in memory module 210. Over time, observer 208 updates location information 218 and availability 220 based on changes in agent status detected by observer 208. Observer 208 may track location information 218 for agents in a variety of ways. In a particular embodiment, observer 208 determines the location of agents 108a-108d based on which access point 112a-112c each agent is using to connect to LAN 114. In another embodiment, observer 208 monitors location information 218 for agents determined by global positioning system (GPS) locators carried by agents, which may be incorporated into wireless communication devices 110a-110d. In yet another embodiment, agents 108a-108d carry radio frequency identification (RFID) transmitters, and observer 208 monitors RFID stations located throughout facility 102 to determine the location of agents 108a-108d. In still another embodiment, agents 108a-108d could be located by the use of cardkeys that allow access to particular areas. In still other embodiments, agents 108a-108d could register their positions when they log on to system 100. Although particular methods for locating agents 108a-108d have been described, it should be understood that any method for determining the agents' location is contemplated within the scope of the present invention.

In a particular embodiment, ACD 104 receives a call requesting a call center agent and determines one or more skills and one or more resources 106a-106f associated with the request. ACD 104 routes in the call to a suitable agent based on the requested combination of skills and the requested resource 106a-106f. For example, if a customer requests information about the availability of lumber at a particular retail store, ACD 104 could route the call to an agent who is in the lumber department. If the same customer also requested that the agent spoke Spanish, then the call could be routed to a Spanish-speaking agent that is in proximity to (or in an area adjacent to) the lumber department. Calls may also be preferentially routed to agents 108a-108d that do not have rare or unique skills in order to save those skills for future calls. Similarly, calls may be preferentially routed away from agents 108a-108d in proximity to resources 106a-106f that are requested most often, so that access to such high-demand resources may be distributed most efficiently.

In other embodiments, ACD 104 requests agents 108a-108d to move from one location to another in order to most effectively fulfill customer requests. This may be particularly useful when an agent has a unique skill that may be used in conjunction with multiple resources 106a-106f. Thus, for example, if a customer requests a Spanish-speaking agent to answer a query about the availability of appliances, and there are no Spanish-speaking agents in the appliance department, ACD 104 may request a Spanish-speaking agent to move to the appliance department. The request process may be interactive with the agent as well, so that, for example, the agent would have to acknowledge the move using wireless communication device 110a-110d before the call would be connected. If the agent fails to answer or answers negatively, ACD 104 could place the call in queue 206, request a different agent to move, determine if the caller is willing to accept a different agent, or otherwise manage the situation. The communication between ACD 104 and wireless communication devices 110a-110d may take place using any suitable messaging protocol, such as extensible markup language (XML) messaging, short message service (SMS), or text messaging.

In still other embodiments, ACD 104 uses location information 218 to determine call priority. In a particular embodiment, ACD 104 determines an order in which to connect calls based on the resource 106a-106f requested by each call and location information 218 for agents 108a-108d. For example, ACD 104 may receive a first call that requests an agent in the appliance department and a second call that requests an agent in the hardware department. If an agent is currently in the hardware department and no agent is currently near the appliance department, ACD 104 may elect to route the second call to the agent in the hardware department, while placing the first call in queue 206. In this manner, ACD advantageously exploits the agent's current position, rather than requiring the agent to move back and forth between departments.

In yet more embodiments, ACD 104 uses a priority system based on the amount of time a caller has been in queue 206 to determine whether to move agents. In this manner, ACD 104 may route calls requesting an agent's current location before calls that would require the agent to move. But if a call that would require the agent to move has been in queue 206 for a sufficient amount of time, then the agent could be instructed to move despite other calls that request the agent's current location.

In performing the routing associated with any of these embodiments, processor 202 and ACD 104 may perform a statistical analysis in order to determine the most appropriate agent to connect with an incoming caller, in order to increase the probability that subsequent callers requesting specific skills and/or specific resources will find an agent having that skill or having access to that resource. This statistical analysis may take into account predetermined priorities, such as the fact that demand rises for certain sections during a particular time of year. It may also take into account information such as the number of callers in a queue that are requesting a particular service. In various embodiments, each agent 108a-108d may have an entire resume of particular skills available. Such skills may include business types (such as electronics, hardware, appliances, or lumber) which the particular agent is trained in responding to, languages spoken by the agent (English, Spanish, French, German, etc.), or other expertise. The statistical analysis may take into account the entire skill set of each agent in determining a "preferred" agent, or "appropriate" agent to connect with the call. Business type may also refer to a particular knowledge base of an agent(s) (e.g., competence in a particular subject(s)).

Various embodiments of ACD 104 may use location information 218 monitored during calls, such as location information 218 monitored during call wrap-up, to improve the ability of ACD 104 to identify requested skills and resources 106a-106f. Such information may be used to prepare real-time or historical reports on the location of agents 108a-108d, the demand for resources 106a-106f, and the response of such information to time and circumstances. For example, a report may indicate an increase in demand for particular resources 106a-106f in real-time in the queue. Similarly, a report may show historical changes in demand in morning and evening, on particular days or seasons of the year, or under other circumstances. In a particular embodiment, such information may also be used to determine the rate at which resources 106a-106f are being used in response to call requests in order to identify high-demand resources.

In other embodiments, ACD 104 may use wrap-up information to determine whether an agent moved from a department identified by ACD 104 to a different department while handling the call. Based on similar information taken after a number of calls, ACD 104 may determine call characteristics associated with moving agent from the initial resource 106a-106f to a different resource 106a-106f, and may in turn use that information to assist in determining what resources 106a-106f will be useful in response to a call with similar characteristics. For example, if it is determined that callers that are interested in nails are always selecting the lumber department, when nails are actually located in the hardware department, the IVR application can be enhanced to ask the caller to select hardware if they are interested in nails. In various embodiments, location information may automatically be added to call wrap-up data, so that the agent does not have to enter it.

Figure 3A:
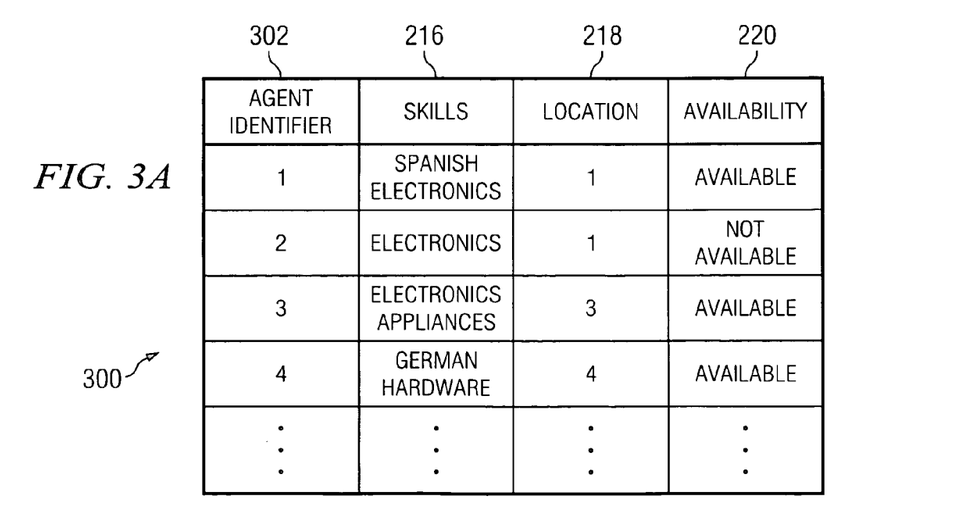
FIGS. 3A, 3B, and 3C illustrate tables for storing information about the locations of agents and resources within the facility depicted in FIG. 1.
Figure 3B:
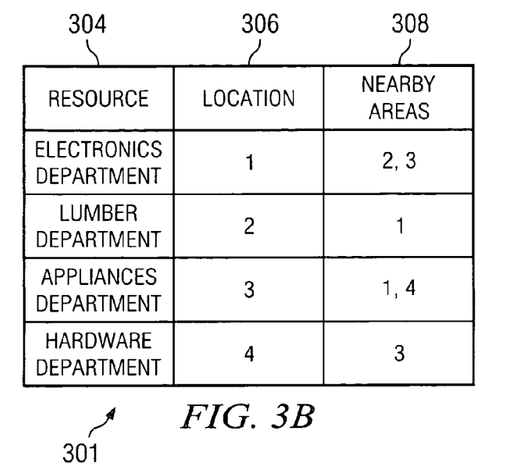

FIGS. 3A and 3B illustrate tables that organize location information for agents and resources. Such tables may be used by various embodiments of ACD 104 to assist in call routing. FIG. 3A illustrates a table 300 that organizes agent status information 214. Each agent is identified by an agent identifier 302. Associated with each agent identifier 302 are skills 216, location 218, and availability 220 for each agent. Location 218 and availability 220 may be periodically or continuously updated by observer 208.

In the illustrated embodiment, skills 216 include languages (Spanish, German, etc.) and proficiencies (electronics, hardware, etc.). Location 218 is a number that specifies a geographic area within facility 102 within which agent 108a-108d is currently located. Availability 220 indicates whether the agent is available or not, and may include factors such as whether the agent is logged in, whether the agent is on break, whether the agent is handling a call, or other similar factors affecting availability.

Figure 3C:
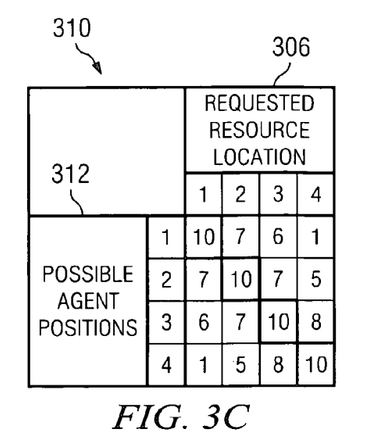

The information in FIG. 3A may be used in conjunction with resource locations in FIGS. 3B and/or 3C to facilitate call routing decisions. In FIG. 3B, table 301 associates each resource name 304 with a location 306 and a list of nearby areas 308. Resource locations 306 and nearby areas 308 correspond to the geographic areas identifying agent location 218.

FIG. 3C illustrates a table 310 that relates possible agent locations 312 to resource locations 306. Table 310 rates the proximity of each possible agent location 312 as a "location skill." For example, if a resource in area 1 is requested, agents in area 1 will be rated at a 10 in the "area 1 location skill," while agents in area 2 will be rated at 7, and so on. On the other hand, if a resource in area 4 is requested, agents in area 1 will only be rated at a 1 in the "area 4 location skill," agents in area 2 will be rated at 5, and so on. Thus, as agent locations 218 are updated continuously or periodically, ACD 104 may use table 310 to update location skill ratings for agents 108a-108d. This allows ACD 104 to treat location information as a time-varying skill that may be used along with other skills in skill-based routing.

The tables illustrated in FIGS. 3A, 3B, and 3C are examples of particular methods of organizing agent status information 214 and resource information 222, but it should be understood by one skilled in the art that other forms of organization are possible. In particular, forms of organization such as databases, profiles, or other suitable memory structures may be used in various embodiments. In general, any suitable method for organizing location that is usable in any of the embodiments described above may be employed.

Figure 4:
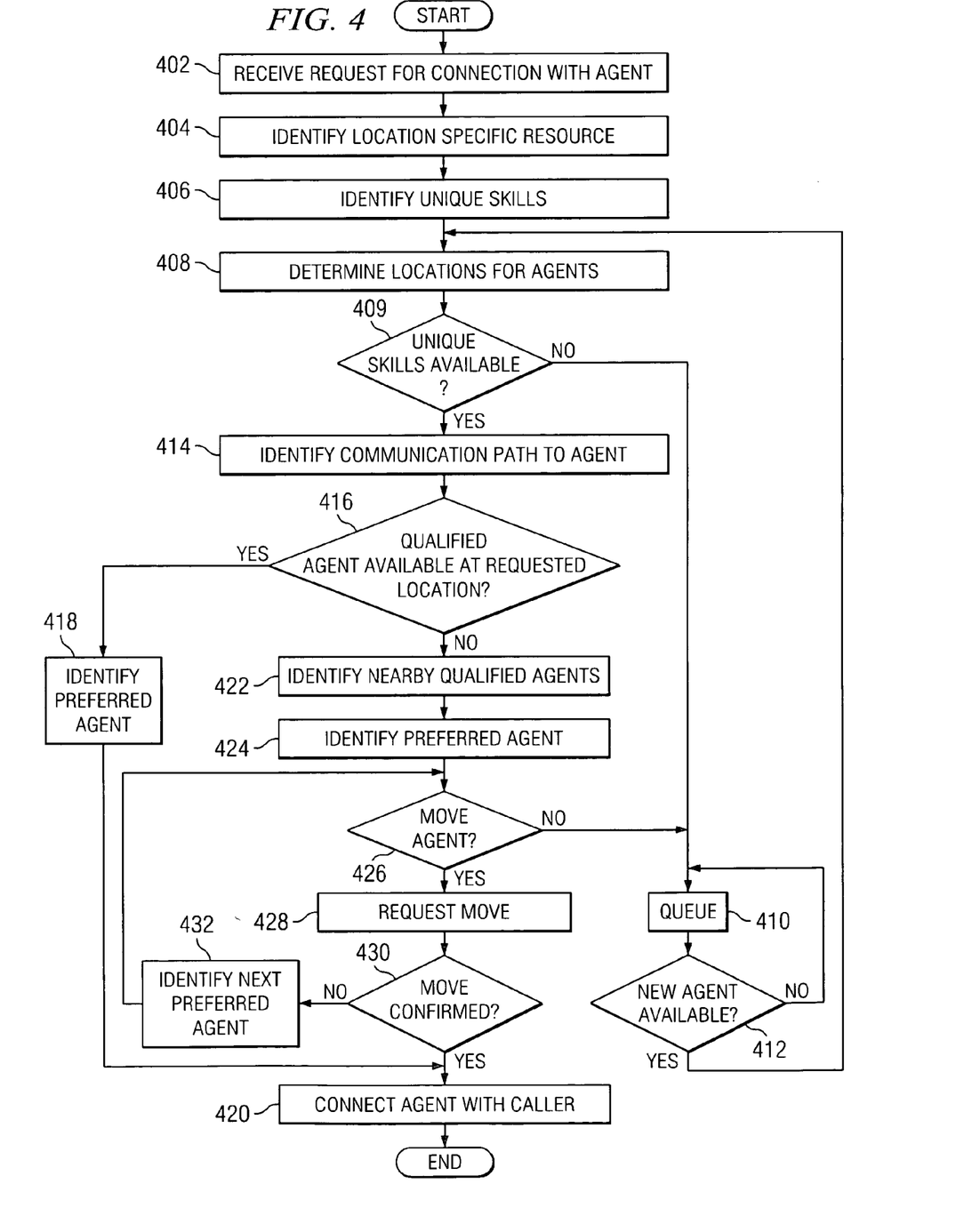
FIG. 4 illustrates a method for automatic call distribution, in accordance with another embodiment of the present invention.

FIG. 4 is a flow chart 400 illustrating a particular embodiment of a method for routing calls using location information for agents. ACD 104 receives a request for connection with an agent at step 402. ACD 104 identifies any location-specific resources 106a-106f associated with the request at step 404, and further identifies any unique skills associated with the request at step 406. ACD 104 also causes observer 208 to determine location information 218 for agents 108a-108d at step 408 in order to determine which agents 108a-108d are in proximity to which resources 106a-106f.

ACD 104 determines whether an agent with the requested skills is available at decision step 409. If no suitable agents are available, then the call may be placed in queue 206 until a new agent 108a-108d becomes available. Once a new agent becomes available, as shown in decision step 412, ACD 104 may once again determine locations for available agents 108a-108d at step 408, and determine whether an agent with requested skills has become available at step 409.

If one or more agents with the requested skills are available, then ACD 104 may determine a communication path to those agents 108a-108d at step 414. In decision step 416, ACD 104 determines whether one or more qualified agents are available at the location of the requested resource 106a-106f (hereafter referred to as "the requested location"). If one or more qualified agents are available at the requested location, then at step 418, ACD 104 may identify a preferred agent, along with the associated communication path, from among the qualified agents at the requested location. ACD 104 connects the caller with the preferred agent using the preferred communication path at step 420, in which case the method is at an end.

If a qualified agent with the requested skills is available, but not at the requested location, ACD 104 may elect to move a qualified agent from the agent's present location to the requested location. Thus, ACD 104 may identify qualified agents near the requested location at step 422. ACD 104 identifies a preferred agent to be moved and the associated communication path to that agent at step 424. The preferred agent may be identified based on skill set, so that agents with unique skills are preferentially reserved for calls requiring those skills. The identification of the preferred agent may also take the agent's present location into account, so that, for example, an agent in closer proximity to the requested location may be preferentially selected.

Once a preferred agent has been identified, ACD 104 may determine whether to move the agent at decision step 426. Examples of considerations that may be used in determining whether to move the preferred agent include whether the distance between the agent's present location and the requested location is above a certain threshold or whether there are calls in queue 206 that require an agent in the agent's current location. If ACD 104 elects not to move the preferred agent, the call may be placed in queue 206 at step 410 until a new agent becomes available.

If ACD 104 elects to move the agent, ACD 104 may send a message to the preferred agent requesting the preferred agent to move to the requested location at step 428. The preferred agent may then confirm the move, as shown in decision step 430. If the move is confirmed, ACD 104 connects the caller with the preferred agent using the associated communication path at step 420, in which case the method is at an end. Otherwise, ACD 104 may identify another preferred agent at step 432, and repeat the method from step 426.

Although a particular method of operation is described, embodiments of the present invention may employ numerous other suitable methods of operation. For example, the described method could be adapted to multiple call requests that are placed in a queue by ACD 104. In such an embodiment, ACD 104 might determine the order in which to answer calls based on the location information of agents 108a-108d. Furthermore, ACD 104 might instruct one or more agents 108a-108d in particular locations and/or having particular skills to move to other locations in response to overall caller demand for agents at particular locations. These and other embodiments, including in particular any method of operation consistent with any of the embodiments described above, should be understood to be contemplated within the scope of the present invention.

Figure 5:
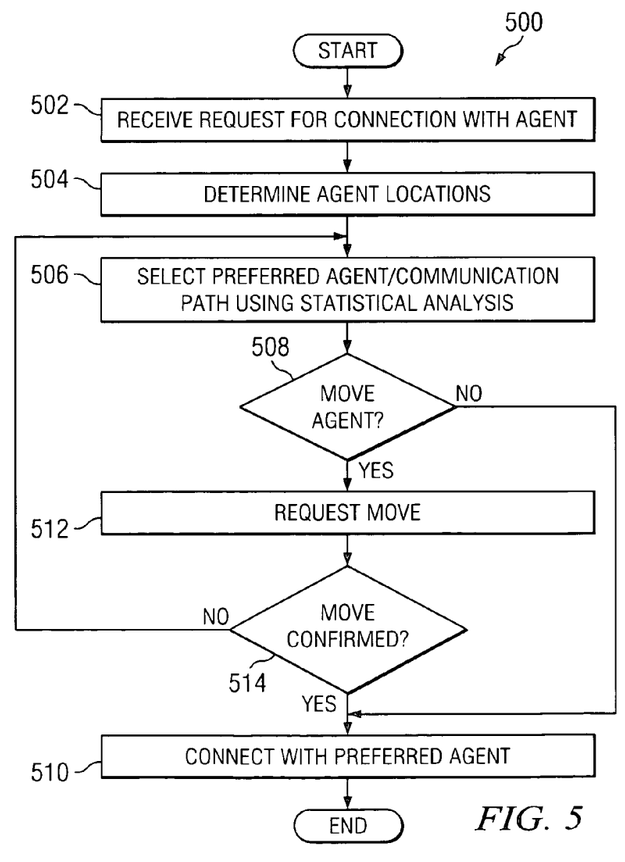
FIG. 5 illustrates a method for handling calls directed to an ACD, in accordance with still another embodiment of the present invention.

FIG. 5 is a flow chart 500 illustrating a particular embodiment of a method using statistical analysis and location information 218 to route a call to an agent. ACD 104 receives a request for connection with an agent at step 502. ACD 104 may identify requested skills and resources 106a-106f based on the request. ACD 104 causes observer 208 to determine agent locations at step 504.

Using information about the agents' locations and skills, ACD 104 applies statistical analysis to determine a preferred agent and associated communication path at step 506. The statistical analysis may be used to increase the probability that unique skills or resources 106a-106f in high demand will be available for subsequent callers. The statistical analysis may also be part of a queuing process that determines the order in which calls will be connected to agents.

Once a preferred agent is identified, ACD 104 may determine whether to move the agent at decision step 508. If ACD 104 elects to move the agent, ACD 104 communicates to the agent a message requesting the agent to move at step 512. If the agent confirms the move, ACD 104 connects the call to the preferred agent at step 510, and the method is at an end. Otherwise, ACD 104 may select another preferred agent using statistical analysis at step 506 and repeat the method from there.

The described method of using statistical analysis is only one of many possible embodiments. Other embodiments might include, for example, receiving multiple calls in a queue and using the overall demand for particular services and relative proximity of agents to resources in the statistical analysis. These and other embodiments, and in particular, any method of operation consistent with any of the embodiments described above, should be understood to be contemplated within the scope of the present invention.

Numerous technical advantages may be achieved by various embodiments of the present invention. One advantage of particular embodiments includes the use of agent's location to optimize the selection of agents who can best handle a call. Another technical advantage is the use of agent's location as a time-varying skill. Yet another technical advantage is the use of agent's proximity to particular locations as a proficiency level in a location skill. Still another technical advantage is the ability to factor the location of an agent as a criterion for selecting the order of calls to be answered. An additional technical advantage is the use of information regarding the skills required by callers in the queue in order to direct agents to areas where they may be able to provide the best service to callers.

Another technical advantage is the use of time-varying proximity of the agents to various departments as a level of location proficiency factored into routing decisions. Yet another technical advantage is the combination of time- and location-varying agent skills with static skills and proficiency ratings in these skills that may be used in call centers to provide powerful routing and positioning of agents. Still another technical advantage is augmenting the call center reporting portfolio with agent location data during their work shift, during calls, and during call wrap-up. Additional technical advantages include automatically using location information during call wrap-up to improve the design of call center applications. The enumerated technical are only some examples of the numerous technical advantages that will be apparent in various embodiments to one skilled in the art, and particular embodiments may include all, some, or none of the enumerated technical advantages.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for distributing calls of an automatic call distributor system, comprising:
   determining location information for a plurality of agents at a call center;
   routing a request for a telecommunication connection with one of the agents to one of the agents based at least in part on the location information;
   in response to the request for connection with one of the agents, communicating a message to at least one of the agents requesting the at least one agent to move to a new location; and establishing the telecommunication connection with the agent.

2. The method of claim 1, wherein the step of routing is further based on determining that one or more of the agents has a particular skill.

3. The method of claim 2, wherein:
   the skill is rated according to a proficiency level;
   the location information comprises a location skill rating, wherein the location skill rating for each agent is determined based on the proximity of the agent to a particular resource.

4. The method of claim 1, wherein the agents communicate with the automatic call distributor system using wireless communication devices.

5. The method of claim 4, wherein the location information identifies a wireless access point used by the agent to access the automatic call distributor system.

6. The method of claim 4, wherein the wireless communication devices comprise Internet protocol (IP) telephones.

7. The method of claim 1, wherein the location information is determined based on global positioning system (GPS) devices carried by the agents.

8. The method of claim 1, wherein:
   the agents are equipped with radio frequency identification (RFID) transmitters monitored by a plurality of RFID stations; and
   the location information is determined based on which of the RFID stations detects each of the agents.

9. The method of claim 1, wherein the step of routing comprises determining the agent to whom the request is routed using statistical analysis of the location information for the agents, location information for a plurality of resources, and skill information indicating a plurality of skills possessed by one or more of the agents.

10. The method of claim 1, wherein
    the request is one of a plurality of requests from a plurality of callers; and
    the method further comprising determining an order in which to connect the callers to one of the agents based on the location information.

11. The method of claim 9, wherein:
    the request is one of a plurality of requests received from a plurality of callers, wherein the request are places in a queue;
    the method further comprises:
      skipping at least one caller in the queue based on the location information; and
      increasing a priority rating for the skipped caller.

12. The method of claim 1, wherein the call center is a time division multiplex (TDM) system.

13. The method of claim 1, further comprising generating a report of agent locations at a particular time.

14. The method of claim 13, wherein:
    the particular time is one of a plurality of times; and
    the report comprises agent locations at each of the times.

15. A method for managing agents in a call center, comprising:
    determining location information for a plurality of agents in a call center; and
    in response to at least one request for connection with one of the agents, communicating a message to at least one of the agents requesting the at least one agent to move to a new location.

16. The method of claim 15, wherein the method further comprises:
    determining which of the agents possesses a particular skill; and
    determining which of the agents will be requested to move is based at least in part on which of the agents possesses the particular skill.

17. The method of claim 15, wherein:
    the location information comprises an indication of the proximity of each of the agents to a particular resource; and
    determining which of the agents to move based at least in part on the respective proximity of the agents to the particular resource.

18. The method of claim 15, wherein the agents communicate with the automatic call distributor system using wireless communication devices.

19. The method of claim 15, wherein the location information identifies a wireless access point used by the agent to access the automatic call distributor system.

20. The method of claim 15, wherein the wireless communication devices comprise Internet protocol (IP) telephones.

21. The method of claim 15, wherein the location information is determined based on global positioning system (GPS) devices carried by the agents.

22. The method of claim 15, wherein:
    the at least one request comprises a plurality of requests; and
    the method further comprises:

detecting an increase in a demand for a particular resource based on the plurality of requests; and
determining which of the agents to move based at least in part on the increased demand for the particular resource.

23. The method of claim 15, wherein:
the at least one request comprises a plurality of requests; and the method further comprises determining whether to move one or more of the agents based at least in part on the requests.

24. The method of claim 15, wherein the method further comprises determining which of the agents to move based on statistical analysis of the location information for the agents, location information for a plurality of resources, and skill information indicating a plurality of skills possessed by one or more of the agents.

25. The method of claim 15, further comprising generating a report of location requirements for a plurality of callers in a queue at a particular time.

26. The method of claim 25, further comprising determining which of the agents to move based at least in part on the location requirements.

27. The method of claim 25, wherein:
the particular time is one of a plurality of times; and
the report comprises location requirements at each of the times.

28. The method of claim 27, further comprising determining when to request the agents to move based on changes in the location requirements over time.

29. An automatic call distributor including at least one processor, comprising:
an observer operable to determine location information for a plurality of agents at a call center;
a distributor operable to route a request for a telecommunication connection with one of the agents to one of the agents based at least in part on the location information;
an interface operable to communicate a message to at least one of the agents requesting the at least one agent to move to a new location in response to the request for connection with one of the agents; and wherein the automatic call distributor operable to establish the telecommunication connection with the agent.

30. The automatic call distributor of claim 29, wherein the processor is further operable to determine that one or more of the agents has a particular skill.

31. The automatic call distributor of claim 29, wherein:
the skill is rated according to a proficiency level;
the location information comprises a location skill rating, wherein the location skill rating for each agent is determined based on the proximity of the agent to a particular resource.

32. The automatic call distributor of claim 29, wherein the agents communicate with the automatic call distributor system using wireless communication devices.

33. The automatic call distributor of claim 32, wherein the location information identifies a wireless access point used by the agent to access the automatic call distributor system.

34. The automatic call distributor of claim 32, wherein the wireless communication devices comprise Internet protocol (IP) telephones.

35. The automatic call distributor of claim 29, wherein the location information is determined based on global positioning system (GPS) devices carried by the agents.

36. The automatic call distributor of claim 29, wherein the processor is further operable to determine the agent to whom the request is routed using statistical analysis of the location information for the agents, location information for a plurality of resources, and skill information indicating a plurality of skills possessed by one or more of the agents.

37. The automatic call distributor of claim 29, wherein:
the request is one of a plurality of requests from a plurality of callers; and
the processor is further operable to determine an order in which to connect the callers to one of the agents based on the location information.

38. An automatic call distributor comprising at least one processor, comprising:
an observer operable to determine location information for a plurality of agents in a call center; and
an interface operable to communicate a message to at least one of the agents requesting the at least one agent to move to a new location in response to at least one request for a telecommunication connection with one of the agents; and wherein the automatic call distributor operable to establish the telecommunication connection with the agent after the agent moves to the new location.

39. The automatic call distributor of claim 38, wherein the processor is further operable to:
determine which of the agents possesses a particular skill; and
determine which of the agents will be requested to move is based at least in part on which of the agents possesses the particular skill.

40. The automatic call distributor of claim 38, wherein:
the location information comprises an indication of the proximity of each of the agents to a particular resource; and
the processor is further operable to determine which of the agents to move based at least in part on the respective proximity of the agents to the particular resource.

41. The automatic call distributor of claim 38, wherein the agents communicate with the automatic call distributor system using wireless communication devices.

42. The automatic call distributor of claim 41, wherein the location information identifies a wireless access point used by the agent to access the automatic call distributor system.

43. The automatic call distributor of claim 41, wherein the wireless communication devices comprise Internet protocol (IP) telephones.

44. The automatic call distributor of claim 38, wherein the location information is determined based on global positioning system (GPS) devices carried by the agents.

45. The automatic call distributor of claim 38, wherein:
the at least one request comprises a plurality of requests; and
the processor is further operable to:
detect an increase in a demand for a particular resource based on the plurality of requests; and
determine which of the agents to move based at least in part on the increased demand for the particular resource.

46. The automatic call distributor of claim 38, wherein:
the at least one request comprises a plurality of requests; and
the processor is further operable to determine whether to move an agent based at least in part on the requests.

47. The automatic call distributor of claim 38, wherein the processor is further operable to determine which of the agents to move based on statistical analysis of the location information for the agents, location information for a plurality of resources, and skill information indicating a plurality of skills possessed by one or more of the agents.

48. Logic embodied in a computer-readable medium, operable to perform the steps of:
- determining location information for a plurality of agents at a call center;
- routing a request for a telecommunication connection with one of the agents to one of the agents based at least in part on the location information;
- in response to the request for connection with one of the agents, communicating a message to at least one of the agents requesting the at least one agent to move to a new location; and
- establishing the telecommunication connection with the agent.

49. The logic of claim 48, wherein the step of routing is further based on determining that one or more of the agents has a particular skill.

50. The logic of claim 48, wherein:
- the request is one of a plurality of requests from a plurality of callers; and
- the logic is further operable to perform the step of determining an order in which to connect the callers to one of the agents based on the location information.

51. Logic embodied in a computer-readable medium operable to perform the steps of:
- determining location information for a plurality of agents in a call center;
- in response to at least one request for a telecommunication connection with one of the agents, communicating a message to at least one of the agents requesting the at least one agent to move to a new location; and
- establishing the telecommunication connection with the agent after the agent moves to the new location.

52. The logic of claim 51, further operable to perform the steps of:
- determining which of the agents possesses a particular skill; and
- determining which of the agents will be requested to move is based at least in part on which of the agents possesses the particular skill.

53. The logic of claim 51, wherein:
- the at least one request comprises a plurality of requests; and
- the logic is further operable to perform the step of determining whether to move an agent based at least in part on the requests.

54. A system for automatically distributing calls, comprising:
- means for determining location information for a plurality of agents at a call center;
- means for routing a request for a telecommunication connection with one of the agents to one of the agents based at least in part on the location information;
- means for communicating a message to the agents requesting the at least one agent to move to a new location in response to the request for connection with one of the agents; and
- means for establishing the telecommunication connection with the agent.

55. A system for managing agents at a call center, comprising:
- means for determining location information for a plurality of agents in a call center;
- means for communicating a message to at least one of the agents requesting the at least one agent to move to a new location in response to at least one request for a telecommunication connection with one of the agents; and
- means for establishing the telecommunication connection with the agent after the agent moves to the new location.

* * * * *